United States Patent [19]

Krienke et al.

[11] Patent Number: 5,134,971
[45] Date of Patent: Aug. 4, 1992

[54] LIVE FOWL CONVEYOR

[76] Inventors: Paul M. Krienke, R.R. 1, Box 24; David M. Haala, P.O. Box 381, both of Sleepy Eye, Minn. 56085

[21] Appl. No.: 664,025

[22] Filed: Mar. 4, 1991

[51] Int. Cl.$^5$ .................... A01K 37/00; B65G 15/10
[52] U.S. Cl. .................. 119/97.2; 198/817; 452/53; 452/177
[58] Field of Search .............. 119/97.2, 97.1, 82; 198/817; 452/53, 177, 182

[56] References Cited

U.S. PATENT DOCUMENTS

| | | | |
|---|---|---|---|
| 2,210,377 | 8/1940 | Oronato et al. | 452/177 X |
| 2,484,088 | 10/1949 | Hayes | 119/97.1 |
| 2,590,291 | 3/1952 | Albright | 452/177 X |
| 3,796,192 | 3/1974 | Parker, Jr. | 119/97.2 |
| 3,833,966 | 9/1974 | Harben, Jr. | 452/53 |
| 4,307,683 | 12/1981 | Parker, Jr. | 119/97.2 |
| 4,658,476 | 4/1987 | van den Brink | 119/97.1 X |

Primary Examiner—Robert P. Swiatek
Assistant Examiner—Nicholas D. Lucchesi
Attorney, Agent, or Firm—Lawrence M. Nawrocki

[57] ABSTRACT

A conveyor for supporting live fowl to be inoculated, iseminated, debeaked, or to have another operation performed on them. The conveyor includes a base, a pair of spindles mounted to the base, one at each of opposite ends, and a generally horizontally-disposed moving conveyor surface supported by the base. The conveyor surface is defined by an endless web encircling the spindles and is intended to receive thereon fowl which are to have an operation performed on them. The conveyor also includes apparatus for holding each bird in a defined position on the conveyor surface, including a pair of elongated, generally-parallel members spaced upward from the conveyor surface to define a slot therebetween. The elongated members are disposed such that the vertical distance between them can be varied.

3 Claims, 3 Drawing Sheets

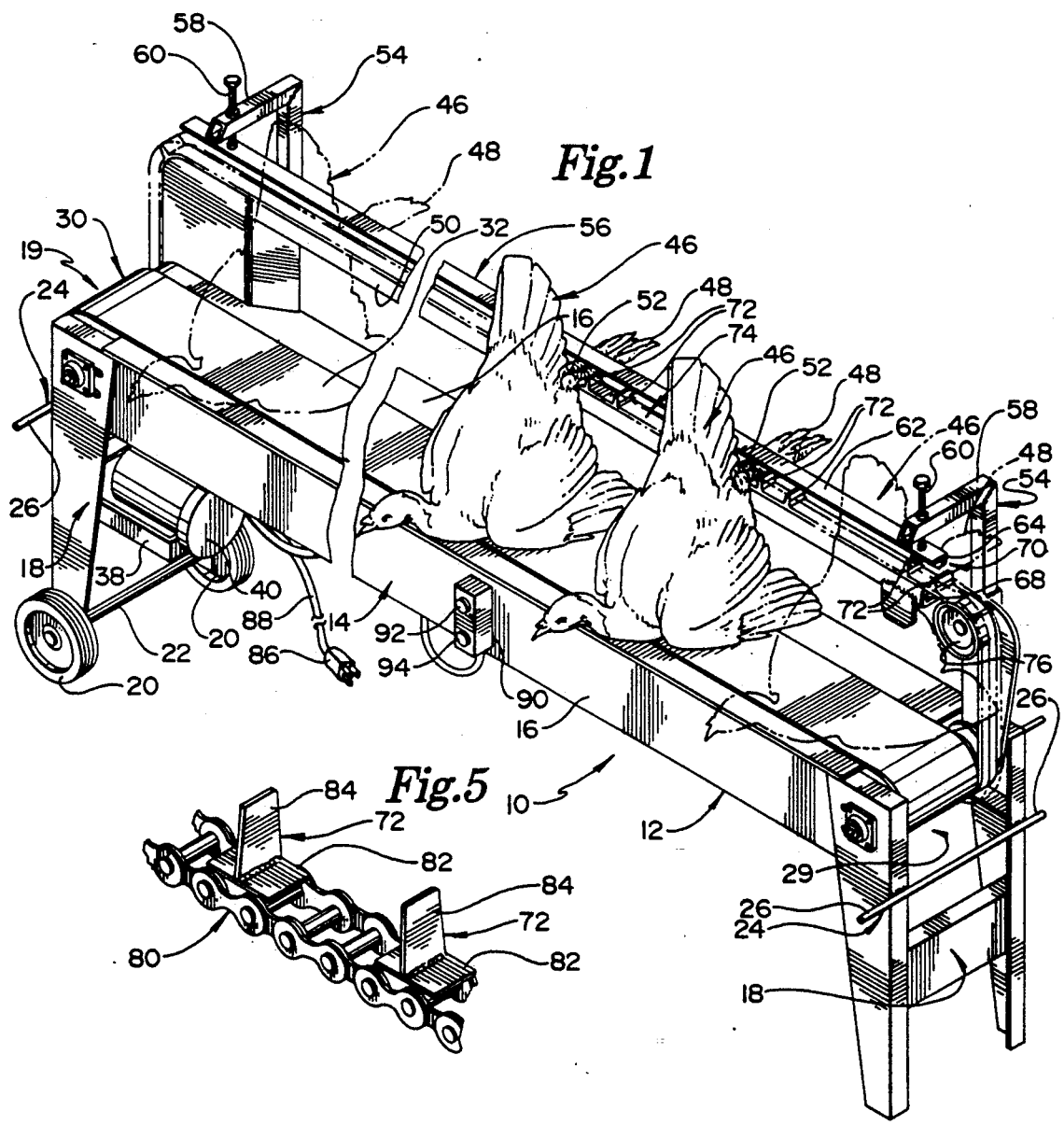

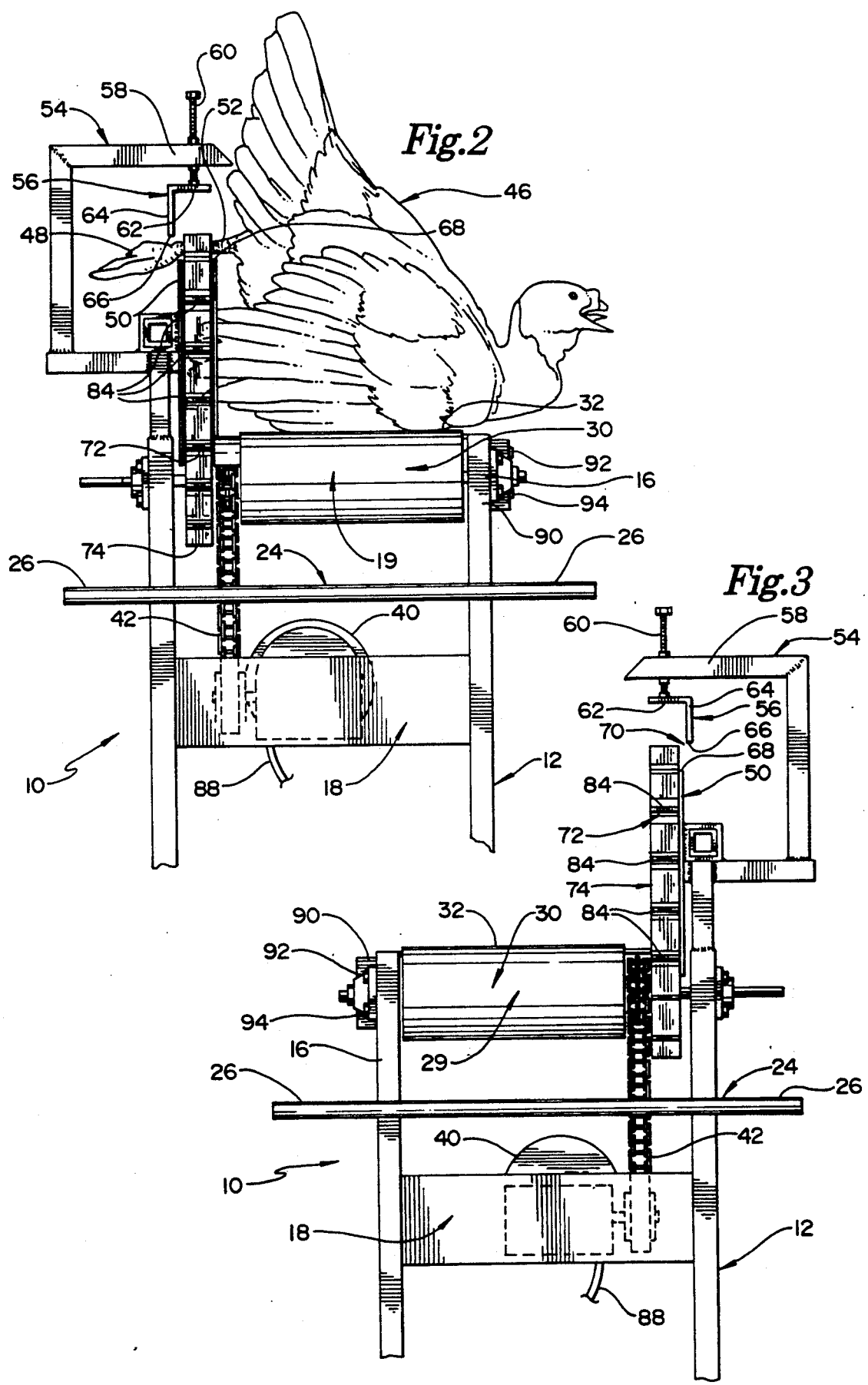

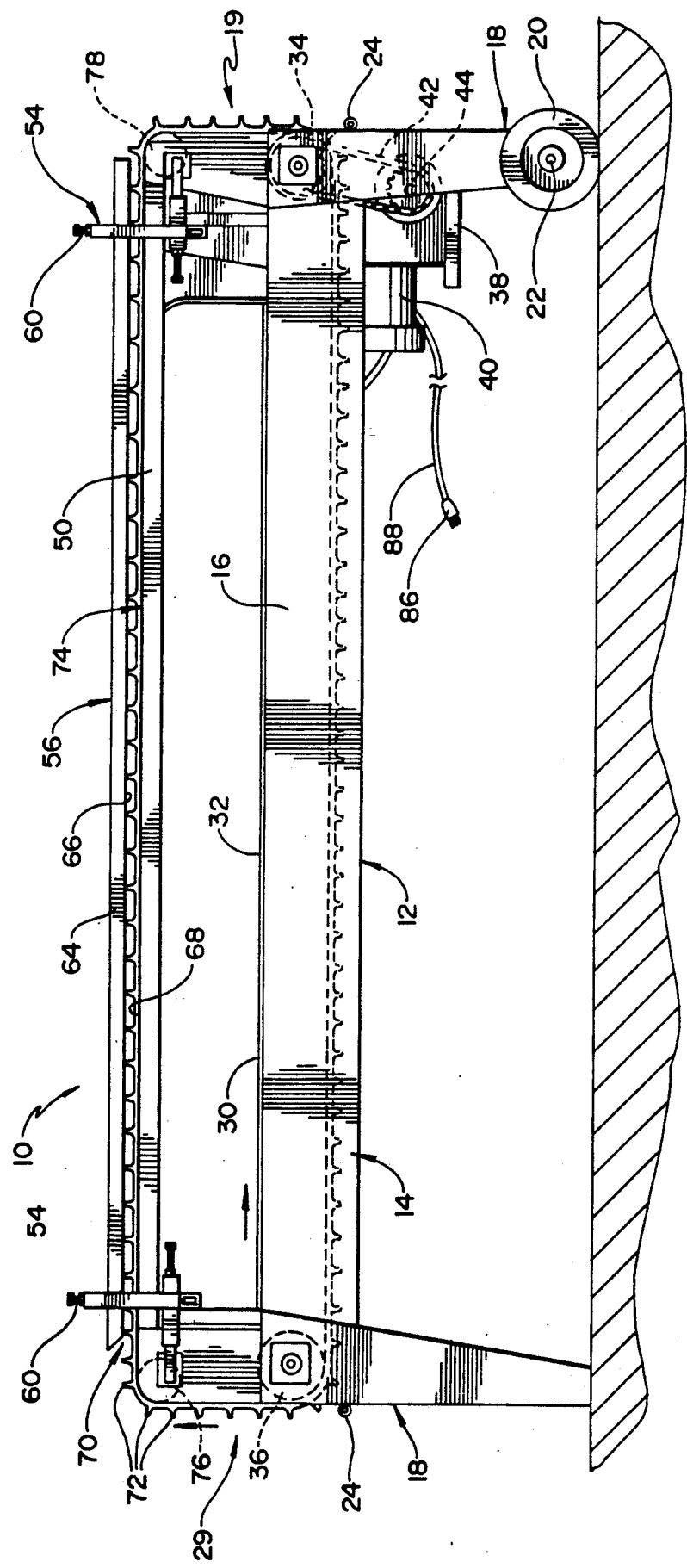

1

LIVE FOWL CONVEYOR

TECHNICAL FIELD

The present invention is directed broadly to the field of animal husbandry. More narrowly, however, the invention deals with raising fowl, such as turkeys, on a commercial scale. The specific focus of the invention is a technology for holding such birds so that various operations can be performed upon them without requiring the continuous attendance of a "catcher" to hold the bird while the various operations are performed.

BACKGROUND OF THE INVENTION

Fowl have become a significant component of the diets of various countries throughout the world. In fact, in many countries, fowl have become a diet staple.

In some countries, particular fowl, such as turkey, has become a traditional holiday meal. For example, in the United States, turkey is generally accepted as the traditional Thanksgiving main course.

The demand for turkeys, chickens, ducks, etc. has spawned numerous "farms" for raising one or more of these types of fowl. For example, throughout the United States, "turkey ranches" now proliferate. Such facilities are intended to provide turkeys for the tables of the world in mass quantities.

Governmental agencies in various countries require vaccination and treating of birds (for example, turkeys) prior to their being placed in commerce. Additionally, various other operations might be desired to be performed on birds. Typically, these include insemination and debeaking, although, certainly, other operations exist.

In performance of such operations, a number of persons are designated as, for example, inoculators. A plurality of other persons are designated as "catchers". The standard procedure utilized in the prior art to accomplish an inoculation procedure is to have the plurality of catchers each capture a bird, hold it firmly while an inoculator effects inoculation, and then release the bird back into the flock. The procedure is inefficient because a "catcher" must wait until the procedure is finished before it can release one bird and catch another.

The problem is made more acute because of the fact that, in the performance of some procedures, a particular part of the bird must be made accessible. For example, when the procedure being formed is insemination rather than inoculation, the bird's vent must be made accessible to the inseminator. As will readily become apparent when one considers the efforts a bird makes to escape its restraints, it would be virtually impossible for the inseminator to hold the bird still, make its vent accessible, and effect the insemination procedure. It is for this reason, therefore, that "catchers" have, heretofore, been required to remain involved in restraining a bird until the procedure is completed.

It is to these problems and dictates of the prior art that the present invention is directed. It is an apparatus, the use of which enables a "catcher" to "shackle" a bird and immediately go back to the flock to capture subsequent birds.

SUMMARY OF THE INVENTION

The present invention is a device for holding and conveying a live fowl which is intended to be inoculated, inseminated, debeaked, or to have some other operation performed on it. The device includes a generally horizontally-disposed conveyor surface on which birds to have the operation performed are placed. The conveyor surface is moving so that birds placed thereon are conveyed from one end of the device to another. Means are provided for holding each bird placed on the conveyor system in a particular location on the surface from which it is precluded from moving. As a result, each bird is made accessible to a person performing the inoculation, insemination, debeaking, or other function.

In a preferred embodiment, the device includes a base, or table, which is provided with a pair of spindles, one mounted at each of opposite ends of the table. Drive means are included for initiating rotational movement of at least one of the spindles about an axis. In this embodiment, the conveyor surface is formed by the upper run of an endless web extending about the spindles. Consequently, the driving of at least one of the spindles translates into the movement of the conveyor surface. The table is so constructed wherein the upper run of the conveyor system defining web is at an accessible height.

In the preferred embodiment, the holding means includes a first elongated bar which is mounted to the table, proximate one lateral edge of the upper run of the endless web, and spaced upwardly from that edge. The bar is oriented, it is intended, substantially parallel to the upper run of the endless web. A second elongated bar, disposed generally parallel to the first bar, is spaced upwardly from the first bar at a relatively small distance to define a generally horizontally-extending slot. If the bars are given sufficient lengths, the slot extends substantially the full length of the table.

In the preferred embodiment, an endless chain or belt, carrying a multiplicity of outwardly-extending cleats, is disposed relative to the slot so that the cleats move along the slot. It is intended that the vertical dimension of each cleat be something greater than the distance between the two bars, although, in some embodiments, the bars might be adjustable so that the distance between them can be varied.

Typically, the endless belt or chain would be extended over pulleys or sprockets at opposite ends of the table and be geared to the endless web drive so that the chain or belt moves at substantially the same speed as does the web. It will be understood that it is intended that the height of the slot above the upper run of the endless web be such that a bird can be placed on the web with its breast in engagement with the web and the feet be inserted into an entrance into the slot, urged into the slot, and moved along the slot at substantially the same speed as the breast of the bird is being moved by the endless web. Additionally, the distance between the slot and the upper run of the endless web would be such that the vent of, for example, a turkey would be made accessible to a person intending to inseminate a bird as it is moved along the apparatus. As will be understood in view of this disclosure, it is intended that the slot be wide enough to accept the legs of a bird with which the apparatus is intended to be used. At the same time, however, the slot should be narrow enough so that the feet of a bird will be inhibited from passing through the slot, once the bird is being conveyed along the conveyor surface.

A number of cleat drive mechanisms are envisioned. A preferred form is a vulcanized rubber belt having a generally V-shaped cross section. Alternatively, however, it is envisioned that a bicycle chain-like structure could also be utilized.

If desired, one or both ends of the table could be provided with wheels at lower extremeties. Also, if desired, manual lifting handles could also be provided.

The present invention is thus a device for facilitating automatic positioning and conveyance of fowl for performance of various operations thereon. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 1 is a perspective view of a structure in accordance with the present invention illustrating a plurality of live birds being conveyed thereon, the illustrated assembly being shortened by cutting away part of the middle section;

FIG. 2 is a left end elevational view of a structure in accordance with the present invention with portions of the support legs being cut away;

FIG. 3 is a right end elevational view of a structure in accordance with the present invention with portions of the support legs being cut away;

FIG. 4 is a rear elevational view of a structure in accordance with the present invention, some parts shown in hidden line, and arrows illustrating endless web and belt drive directions of movement; and FIG. 5 is a fragmentary perspective view of an alternative form of bird leg capturing structure.

DETAILED DESCRIPTION OF THE INVENTION

Referring now to the drawings, wherein like reference numerals denote like elements throughout the several views, FIG. 1 illustrates a conveyor apparatus 10 in accordance with the present invention. The apparatus 10 includes a base 12 which defines a table. A horizontal, elevated portion 14 of the table includes generally horizontally-extending frame members 16 mounted to two, two-leg pairs 18, one pair at either end of the horizontal frame members 16. Attachment of the horizontal members 16 to the leg pairs 18 can be accomplished in any appropriate fashion.

FIGS. 1 and 5 illustrate a conveyor apparatus 10 having the leg pair at the output end 19 of the conveyor mounting a pair of motive wheels 20 at the lower end thereof. The wheels 20 are mounted to opposite ends of a generally horizontally-disposed axle 22 extending through apertures (not shown) formed through lower ends of each leg of the pair 18.

As best seen in FIGS. 1-3, either end of the conveyor apparatus 10 can be provided with a handle 24. Although any appropriate type of handle 24 can be used, the figures illustrate a handle 24 oriented generally perpendicular to the longitudinal axis of the apparatus 10 and extending forwardly and rearwardly from the device so as to make grasping portions 26 accessible. It will be understood that each handle 24 would typically, be at a height sufficient to make it accessible, but not so high so as to obstruct operation of the equipment.

As will be able to be seen in view of this disclosure, one individual could grasp the handle 24 at the input end 29 of the conveyor 10 and lift that end to enable movement of the overall structure in a wheelbarrow-like manner. Alternatively, two individuals, one at either end, could grasp the handle 24 mounted at that end and lift the implement 10 fully off the ground. It will be apparent, then, that the present invention is fairly transportable.

As best seen in FIG. 1, the apparatus 10 is provided with an endless web 30 which defines a moving conveyor surface 32. The web 30 can be formed from any appropriate flexible material. Typically, the web 30 would be formed from a rubberized material which might be provided with a fibrous core to afford strength.

As seen in the figures, a spindle 34, 36 is journaled between laterally-spaced, horitontally-extending frame members, one spindle at either end of the device. Each spindle 34, 36 is provided with an outer surface which is engaged by an inner surface of the endless web 30. The endless web 30 is mounted in a taut fashion over the spindle surfaces, and the surfaces of the spindle members 34, 36 are provided with a sufficiently high coefficient of friction so that, as at least one of the spindles is driven, the web 30 will be driven so that the upper run thereof will define the moving conveyor surface 32.

FIGS. 1 and 4 illustrate a motor mounting support 38 secured between the legs of a leg pair 18 at the output end 19 of the conveyor 10. The support 38, in turn, carries a motor 40 which is illustrated, in FIG. 4, as driving the spindle 34 at the output end 19. As seen in FIG. 4, the output end spindle 34 is made to rotate by means of a transmission chain 42 which is mated to a gear 44 on the motor 40. As the motor 40, and therefore, the gear 44 mounted thereto rotate, the rotational motion will, in turn, be imparted to the output end spindle 34.

In the embodiment illustrated, the input end spindle 36 is slaved to the output end spindle 34. That is, it is allowed to freewheel, and as the drive spindle 34 is made to rotate, it's driving effect upon the endless web 30 will, in turn, convey rotational motion to the spindle 36 at the other end of the device 10.

FIGS. 1 and 2 illustrate a manner in which fowl such as turkeys 46 are placed on the conveyor surface 32 and moved from the input end 29 to the output end 19 of the conveyor system. As previously discussed, one of the applications for the device is to restrain and convey, for example, a turkey 46 so that it can be inseminated. To this end, it is necessary that the bird's vent (not shown) be made accessible. This can be done by placing the bird 46 in position with it's breast on the conveyor surface 32 defined by the endless web 30, elevating its feet 48, and restraining its feet 48 in such an elevated position while it is conveyed along the device 10.

The figures illustrate structure for maintaining the feet 48 of a bird 46 in an elevated position so that its vent is accessible. The structure includes a first bar 50 which is spaced upwardly from the conveyor surface 32. The first bar 50 is elongated along an axis generally parallel to an axis with respect to which the conveyor surface 32 moves. The first bar 50 defines the lowest position that the legs 52 of the fowl 46 can achieve as it is conveyed through the system. Consequently, it is disposed at a height above the conveyor surface 32 sufficient so that the legs 52 will be elevated to a point wherein the vent of the bird 46 will be accessible. The first bar 50, it is intended, is not adjustable vertically, but, rather, is maintained at a fixed height above the conveyor surface 32.

FIGS. 2 and 3 illustrate a strut arrangement 54 by which a second bar 56 is disposed at a desired location relative to the first bar 50. The second bar 56, as is true of the first bar 50, is aligned along an axis which extends generally parallel to an axis with respect to which the endless web 30 moves. Consequently, the second bar 56 is substantially parallel to the first bar 50.

The second bar 56, as previously discussed, is supported by a strut arrangement 54, the arrangement having an assembly proximate each end of the conveyor 10. Each assembly, in turn, has a forwardly-extending, generally-horizontal member 58 which is cantilevered so as to extend above the upper edge of the first bar 50. The cantilevered portion 58 of each assembly is, in turn, provided with a threaded shaft 60, the lower ends of the two shafts 60 suspending the second bar 56. The second bar 56 is shown as taking the form of an angle iron, but it will be understood that any appropriate elongated structure could be employed to function as the second bar 56. An angle iron, however, has a generally horizontal portion 62 by which the lower ends of the threaded shafts 60 can be attached, and a vertical portion 64 which defines a distinct lower edge 66.

As best seen in FIG. 3, an upper edge 68 of the first bar 50 and a lower edge 66 of the second bar 56, together, define a generally horizontal slot 70 therebetween. The vertical dimension of the slot 70 can, of course, be varied in view of the fact that the height of the second bar 56 above the conveyor surface 32 can be adjusted. It is intended, however, that, regardless of the height to which the second bar 56 is adjusted above the conveyor surface 32, the slot 70 will be fully spanned, in a vertical direction, by a series of cleats as will be discussed hereinafter.

FIGS. 2 and 3 illustrate an endless vulcanized rubber belt 74 which mounts a series of cleats or tabs 72 at relatively close intervals therealong. The intervals are best seen in FIG. 4, and, as can be seen in that figure also, the belt 74 is tautly fed about a series of four spindles 34, 36, 76, 78. One of the four spindles is the driven spindle 34 at the output end 19 of the conveyor 10, and the second is the slaved spindle 36 at the input end 29 of the conveyor 10. The other two spindles 76, 78 are ones disposed above respective driven and slaved spindles at a height so as to insure that, as the belt 74 is made to rotate, the cleats or tabs 72 will fully span the horizontal slot 70 in a vertical direction.

Seen in FIGS. 2 and 3, a plane defined by the belt 74 is disposed intermediate the rear edge of the endless web 30 and the bars 50, 56 defining the slot 70. That is, the endless belt 74 is between the slot 70 and the endless web 30 on which the breast of a bird 46 is placed. As seen in FIGS. 2 and 3, however, the endless belt 74 is diposed closely proximate to the slot 70 so as to inhibit withdrawal of the feet 48 of a bird 46 from a position in which they are received between two adjacent cleats 72 and in the slot 70.

FIG. 5 illustrates an alternative embodiment which can be used instead of an endless vulcanized rubber belt. In this embodiment, an endless bicycle-type chain 80 is used, and the chain 80 would be geared to a sprocket carried by one of the spindles about which it is made to extend. In this embodiment, each spindle would carry a sprocket, the teeth of the four sprockets engaging the chain 80.

As seen in FIG. 5, a planar portion 82 of a cleat 72 could be affixed to a link of the chain 80 in an appropriate manner. Typically, affixation could be accomplished by welding. The planar portion 80 of the cleat, in turn, mounts a portion 84 generally perpendicular to the plane defined by the portion 82 by which the cleat 72 is affixed to the chain 80. The transverse portion 84 of the cleat 72 would thereby define the spaced tabs between which the legs 52 of a bird 46 could be maintained as it is conveyed along the device 10.

As previously discussed, the second bar can be made adjustable in a vertical direction. It is desirable that the slot 70 be maintained with a vertical dimension that is only slightly larger than the narrowest portion a bird's leg 52. The foot 48 being larger, it will, when the narrowest portion of a bird's leg 52 is fed into the slot 70, preclude, or at least greatly inhibit, withdrawal. As will be able to be seen then in view of this disclosure, the second bar 56 would be adjusted vertically depending upon the size and type of fowl being innoculated, inseminated, etc.

As discussed above, cantilevered portions 58 of the strut arrangement assemblies 54 mount respective threaded shafts 60. As the shafts 60 are rotated within the apertures in the cantilevered portions 58, the rotation will translate into vertical movement of the shafts 60. Since the second bar 56 is mounted at the lower ends of the shafts 60, such vertical movement of the shafts 60 will effect vertical movement of the second bar 56 and commensurate widening or narrowing of the slot 70.

In using the conveyor 10, an operator would, initially, insert a plug 86 at the end of a motor cable 88 into a receptacle providing appropriate electrical power. It will be understood that, while an electrically-driven motor is illustrated, other types of motors are contemplated as being able to be employed with the present invention.

Assuming, however, employment of an electrically-driven motor 40, a control box 90 is provided with "on" and "off" buttons 92,94. With the plug 86 received within a receptacle, the "on" button 92 can be pressed. Actuation of the motor 40 will initiate movement of the endless web 30, and the gearing is such that the upper run of the web 30 (the conveyor surface 32) will move in an intended direction along the apparatus table.

Similarly, the gearing of the endless belt 74 or chain 80 is such that the movement of the upper run thereof will be in the same direction as that of the upper run of the endless web 30. In view of the fact that the take-off for the belt 74 or chain is from one of the spindles driving the endless web 30, the longitudinal speed of movement of the cleats or tabs 72 will be substantially the same as that of the endless web 30. Consequently, as a bird 46 is conveyed across the apparatus, its body will not tend to be conveyed faster than its feet 48 or dragged behind its feet 48.

With the conveyor system running, one or more catchers could catch birds 46 and bring them to the input end 29 of the apparatus 10. In FIG. 1, the cleats 72 carried by the belt 74 or chain 80 move upwardly at the input end 29 over a spindle 76 disposed above the slaved spindle 36 around which the endless web 30 is fed. As the cleats or tabs 72 of the belt 74 or chain 80 move over that spindle 76, the run becomes horizontally oriented. The cleats 72 have still not moved past the entrance to the slot 70, although they are already disposed above the conveyor surface 32 of the endless web 30. A bird 46 can then be placed in the postion on the web surface 32 with its breast in engagement with that surface. With a bird 46 so disposed, its legs 52 can be placed into engagement with the belt 74 or chain 80 with the legs 52 between adjacent cleats 72.

At this point in time, typically, the catcher would be holding only the bird's feet 48, although the catcher's other hand could be used to steady the body of the bird 46 on the conveyor surface 32 of the web 30. As the conveyor web 30 and belt 74 or chain 80 continue to move, the bird 46 would be conveyed so that its legs 52 entered the slot 70 between the first and second bars 50, 56. Once the legs 52 of the bird 46 entered the slot 70, the catcher would be free to release the bird 46, since it would be unable to move since its legs 52 would be constrained by the two adjacent cleats 72 and the first and second bars 50, 56. With a bird 46 in this position and being conveyed between the input and output ends 29, 19 of the device 10, any of various operations could be performed upon it.

At the output end 19 of the conveyor system, the bird's legs 52 would exit from the slot 70. Once upper constraint were removed as a result of the second bar 56 no longer being present, the bird 46 would be released and would be free to maneuver independently again. It might be desirable to have a catcher capture the bird's feet and place it in a pen (not shown) designed for birds 46 upon whom the operation or operations had already been performed. In any case, however, as the bird 46 is conveyed along the apparatus 10, constraint of a catcher need not be provided.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Apparatus for conveying live fowl to be inoculated, inseminated, debeaked, or to have another operation performed on them, comprising:
   (a) a base;
   (b) a pair of spindles, one spindle mounted at each of opposite ends of said base;
   (c) a generally horizontally-disposed, moving conveyor surface supported by said base and defined by an endless web encircling said spindles, said conveyor surface for receiving thereon fowl which are to have an operation performed on them; and
   (d) means for holding a bird in a defined position on said conveyor service, said holding means including:
      (i) a first elongated member, disposed generally parallel to said conveyor surface, spaced upward a desired distance from a lateral edge of said conveyor surface;
      (ii) a second elongated member, disposed generally parallel to said first elongated member, spaced upward from said first elongated member to define a generally horizontal slot therebetween;
      (iii) means for varying the vertical distance between said first and second elongated members; and
      (iv) a multiplicity of cleats moving along said slot at generally the same speed at which said conveyor surface moves, each of said cleats having a vertical dimension to span said slot;
   (e) wherein, when a bird is placed on said conveyor surface with its breast in engagement with said surface, legs of the bird are fed into said slot at an entrance end thereto and conveyed along said slot by one or more of said cleats at substantially the same speed as that at which the bird is conveyed by said conveyor surface.

2. Apparatus for conveying live fowl to be inoculated, inseminated, debeaked, or to have another operation performed on them, comprising:
   (a) a base;
   (b) a pair of spindles, one spindle mounted at each of opposite ends of said base;
   (c) a generally horizontally-disposed, moving conveyor surface supported by said base and defined by an endless web encircling said spindles, said conveyor surface for receiving thereon fowl which are to have an operation performed on them; and
   (d) means for holding a bird in a defined position on said conveyor service, said holding means including;
      (i) a first elongated member, disposed generally parallel to said conveyor surface, spaced upward a desired distance from a lateral edge of said conveyor surface;
      (ii) a second elongated member, disposed generally parallel to said first elongated member, spaced upward from said first elongated member to define a generally horizontal slot therebetween; and
      (iii) a multiplicity of cleats, comprising a series of tabs mounted, at intervals, to an endless vulcanized rubber belt geared to one of said spindles, moving along said slot at generally the same speed at which said conveyor surface moves, each of said cleats having a vertical dimension to span said slot; and
   (e) wherein, when a bird is placed on said conveyor surface with its breast in engagement with said surface, legs of the bird are fed into said slot at an entrance end thereto and conveyed along said slot by one or more of said cleats at substantially the same speed as that at which the bird is conveyed by said conveyor surface.

3. Apparatus for conveying live fowl to be inocculated, inseminated, debeaked, or to have another operation performed on them, comprising:
   (a) a generally horizontally-disposed, moving conveyor surface on which fowl to have an operation performed on them are placed; and
   (b) means for holding a bird in a defined position on said conveyor surface, said holding means including;
      (i) a first elongated member, disposed generally parallel to said conveyor surface, spaced upward a desired distance from a lateral edge of said conveyor surface;
      (ii) a second elongated member, disposed generally parallel to said first elongated member, spaced upward from said first elongated member to define a generally horizontal slot therebetween;
      (iii) means for varying the vertical distance between said first and second elongated members; and
      (iv) a multiplicity of cleats moving along said slot at generally the same speed at which said conveyor surface moves, each of said cleats having a vertical dimension to span said slot;
   (c) wherein, when a bird is placed on said conveyor surface with its breast in engagement with said surface, legs of the bird are fed into said slot at an entrance end thereto and conveyed along said slot by one or more of said cleats at substantially the same speed as that at which the bird is conveyed by said conveyor surface.

* * * * *